United States Patent
Han et al.

(10) Patent No.: US 12,505,890 B2
(45) Date of Patent: Dec. 23, 2025

(54) MEMORIES AND OPERATION METHODS THEREOF, MEMORY SYSTEMS AND ELECTRONIC DEVICES

(71) Applicant: Yangtze Memory Technologies Co., LTD, Hubei (CN)

(72) Inventors: Jiayin Han, Hubei (CN); Xinlei Jia, Hubei (CN); Kaikai You, Hubei (CN); An Zhang, Hubei (CN); Lei Jin, Hubei (CN)

(73) Assignee: Yangtze Memory Technologies Co., LTD, Wuhan (CN)

( * ) Notice: Subject to any disclaimer, the term of this patent is extended or adjusted under 35 U.S.C. 154(b) by 155 days.

(21) Appl. No.: 18/354,393

(22) Filed: Jul. 18, 2023

(65) Prior Publication Data

US 2024/0312536 A1    Sep. 19, 2024

(30) Foreign Application Priority Data

Mar. 15, 2023    (CN) .......................... 202310270476.6

(51) Int. Cl.
*G11C 11/34*    (2006.01)
*G11C 16/04*    (2006.01)
(Continued)

(52) U.S. Cl.
CPC ...... *G11C 16/3427* (2013.01); *G11C 16/0483* (2013.01); *G11C 16/10* (2013.01); *G11C 16/26* (2013.01); *G11C 2216/28* (2013.01)

(58) Field of Classification Search
CPC ......... G11C 16/10; G11C 16/30; G11C 16/12; G11C 16/0483; H01L 27/115
(Continued)

(56) References Cited

U.S. PATENT DOCUMENTS

| 11,272,716 | B2 * | 3/2022 | Derkx .................... C12N 1/205 |
| 11,482,291 | B2 * | 10/2022 | Choi ...................... G11C 16/32 |
| 2008/0219050 | A1 | 9/2008 | Shalvi et al. |

FOREIGN PATENT DOCUMENTS

| CN | 107665721 A | 2/2018 |
| KR | 20100016759 A | 2/2010 |
| KR | 20100054467 A | 5/2010 |

OTHER PUBLICATIONS

State Intellectual Property Office of the People's Republic of China, "First Examination Opinion Notice," Issued in connection with China application No. 202310270476.6, Sep. 13, 2025, 16 Pages. [English Language Machine Translated].

* cited by examiner

*Primary Examiner* — Son T Dinh
(74) *Attorney, Agent, or Firm* — Hanley, Flight & Zimmerman, LLC

(57) ABSTRACT

Examples of the present disclosure provide a memory and an operation method thereof, a memory system and an electronic device. The operation method comprises: applying a pass voltage to word lines coupled to unselected memory cells of one of memory strings according to a program order of a selected memory cell of the memory string when performing a read operation on the selected memory cell, wherein the earlier the program order of the selected memory cell is, the greater the pass voltage applied to the word lines coupled to the unselected memory cells of the memory string during the read operation is. In the examples of the present disclosure, the pass voltage applied to the word lines coupled to the unselected memory cells is determined according to the program order of the selected memory cell, i.e., according to different degrees of impact of a background pattern dependency effect experienced by the selected memory cell, such that the impact of the back- (Continued)

ground pattern dependency effect can be decreased, and the read disturb is reduced.

17 Claims, 9 Drawing Sheets

(51) Int. Cl.
*G11C 16/10* (2006.01)
*G11C 16/26* (2006.01)
*G11C 16/34* (2006.01)

(58) Field of Classification Search
USPC .................................... 365/185.18, 189.15
See application file for complete search history.

Apply a pass voltage to word lines coupled to unselected memory cells of one of the memory strings according to a program order of a selected memory cell of the memory string when performing a read operation on the selected memory cell, wherein the earlier the program order of the selected memory cell is, the greater the pass voltage applied to the word lines coupled to the unselected memory cells of the memory string during the read operation is — S501

FIG. 5

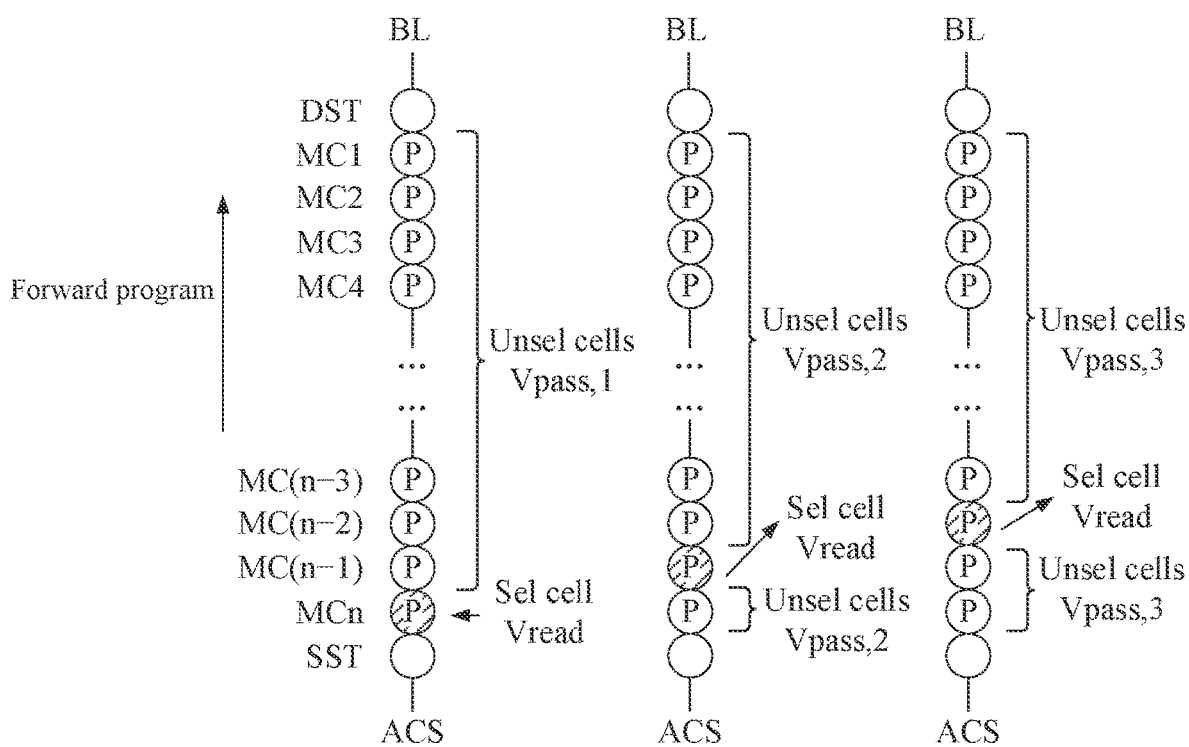

FIG. 6

MEMORIES AND OPERATION METHODS THEREOF, MEMORY SYSTEMS AND ELECTRONIC DEVICES

CROSS-REFERENCE TO RELATED APPLICATION

This patent arises from an application that claims priority to and the benefit of Chinese Patent Application 202310270476.6, filed on Mar. 15, 2023, which is hereby incorporated by reference in its entirety.

TECHNICAL FIELD

Examples of the present disclosure relate to the technical field of semiconductors, and particularly to a memory and an operation method thereof, a memory system and an electronic device.

BACKGROUND

The major characteristic of a flash memory is that it can keep stored information for a long time without power. In order to further increase a bit density of the flash memory and reduce bit cost at the same time, a technology of a three-dimensional flash memory develops rapidly.

BRIEF DESCRIPTION OF THE DRAWINGS

FIG. 5 is a flow diagram of an operation method of a memory provided by examples of the present disclosure;

FIG. 6 is a schematic diagram I of performing a read operation after forward program of memory cells provided by examples of the present disclosure;

Figure 1:
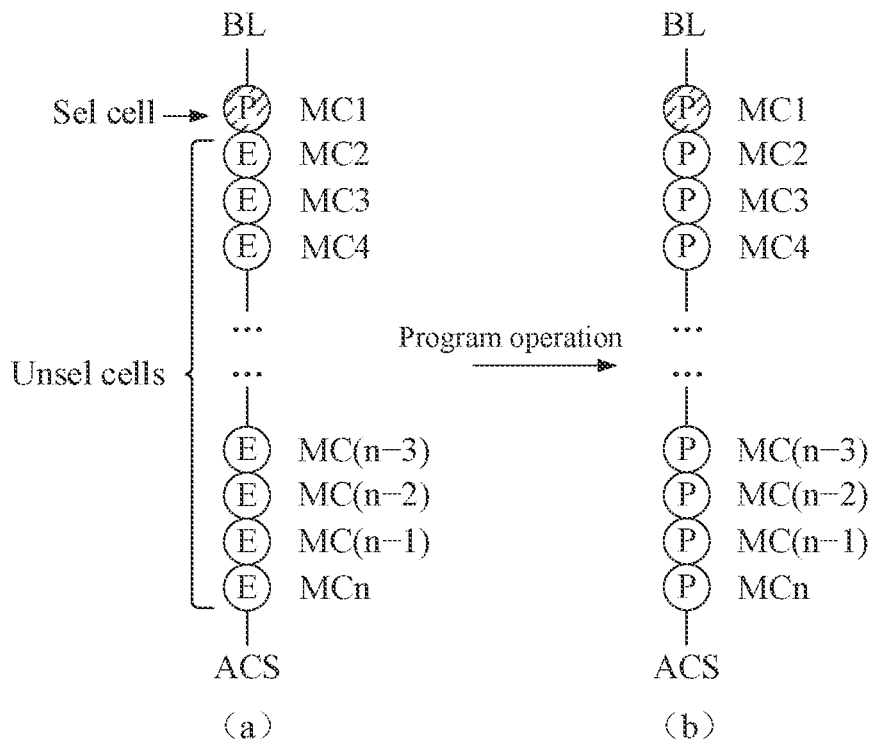
FIG. 1 is a schematic diagram of an operation state of each memory cell of a memory string in a program process.

Reference numerals in the figures: 101, solid line; 102, dashed line; 300, memory; 302, memory cell array; 304, peripheral circuit; 306, memory block; 308, memory cell; 310, memory string; 312, source selective gate; 314, drain selective gate; 316, drain selective gate line; 318, source line; 320, source selective gate line; 322, bit line; 324, word line; 326, memory page; 328, source selective transistor; 330, drain selective transistor; 400, system; 402, memory system; 404, controller; 406, host; 502, memory card; 504, memory card connector; 506, solid-state drive; 508, solid-state drive connector; 600, electronic device.

DETAILED DESCRIPTION

In a development process of the three-dimensional flash memory, the problems of structures and electrical properties encountered also increase as the number of stacked layers is increasing.

The technical solutions in implementations of the present disclosure will be described below clearly and completely in conjunction with the implementations and the drawings of the present disclosure. Apparently, the implementations described are only part, but not all, of the implementations of the present disclosure. All other implementations obtained by those of ordinary skill in the art based on the implementations in the present disclosure without creative work shall fall in the scope of protection of the present disclosure.

In the description below, many specific details are presented to provide a more thorough understanding of the present disclosure. However, it is apparent to those skilled in the art that the present disclosure may be implemented without one or more of these details. In other examples, in order to avoid confusing with the present disclosure, some technical features well-known in the art are not described; that is, not all features of actual examples are described herein, and well-known functions and structures are not described in detail.

In the figures, for clarity, dimensions and relative dimensions of layers, regions and elements may be exaggerated. Like reference numerals denote like elements throughout.

It should be understood that when an element or a layer is referred to as being "on", "adjacent to", "connected to", or "coupled to" another element or layer, it may be directly on, adjacent to, connected to, or coupled to the other element or layer, or one or more intervening elements or layers may be present. In contrast, when an element is referred to as being "directly on", "immediately adjacent to", "directly connected to", or "directly coupled to" another element or layer, there are no intervening elements or layers present. It should be understood that, although the terms first, second, third, etc., may be used to describe various elements, components, regions, layers and/or portions, these elements, components, regions, layers and/or portions should not be limited by these terms. These terms are only used to distinguish one element, component, region, layer or portion from another element, component, region, layer or portion. Thus, a first element, component, region, layer or portion discussed below may be represented as a second element, component, region, layer or portion, without departing from the teachings of the present disclosure. When the second element, component, region, layer or portion is discussed, it does not mean that the first element, component, region, layer or portion is necessarily present in the present disclosure.

The spatially relative terms, such as "beneath", "below", "lower", "under", "above", "upper", and the like, may be used herein for ease of description to describe one element or feature's relationship to other elements or features as illustrated in the figures. It should be understood that the spatially relative terms are intended to further encompass different orientations of a device in use or operation in addition to the orientation depicted in the figures. For example, if a device in the figures is turned over, then an element or a feature described as "below other elements", or "under other elements", or "beneath other elements" will be orientated to "above" the other elements or features. Thus, the exemplary terms, "below" and "beneath", may include both upper and lower orientations. The device may be orientated otherwise (rotated by 90 degrees or other orientations), and the spatially descriptive terms used herein are interpreted accordingly.

The terms used herein are only intended to describe the specific examples, and are not used as limitations of the present disclosure. As used herein, unless otherwise indicated expressly in the context, "a", "one" and "the" in a singular form are also intended to include a plural form. It should also be understood that the terms "consist of" and/or "comprise", when used in this specification, determine the presence of the feature, integer, step, operation, element and/or component, but do not preclude the presence or addition of one or more of other features, integers, steps, operations, elements, components, and/or groups. As used herein, the term "and/or" includes any and all combinations of the listed relevant items.

In order to understand the present disclosure thoroughly, detailed steps and detailed structures will be proposed in the following description to set forth the technical solution of the present disclosure. The detailed descriptions of the preferred examples of the present disclosure are as follows. However, the present disclosure may also have other implementations in addition to these detailed descriptions.

At present, the number of stacked layers of a three-dimensional flash memory is increasing, and the problems of structures and electrical properties encountered thereby are also increasing. A background pattern dependency (BPD) effect is also an important problem encountered after the number of the stacked layers increases. The background pattern dependency effect refers to a forward deviation of a threshold voltage (Vt) of a memory cell being programmed first due to a change in series resistance in a program verify operation stage and a read operation stage. Moreover, since program patterns of different memory strings have differences therebetween, the change in the series resistance also leads to different forward deviations of the threshold voltage, causing a threshold voltage distribution being broadened, thereby reducing a read window margin.

Referring to FIG. 1, FIG. 1 is a schematic diagram of an operation state of each memory cell of a memory string in a program process. As shown in FIG. 1, the memory string corresponds to a channel structure in a memory, and has a plurality of memory cells along an extending direction of the memory string, and the memory cells at different positions correspond to different layers in the memory. In the memory, a word line (WL) is coupled to a gate corresponding to each memory cell and applies a word line voltage to a gate of a transistor corresponding to the memory cell. The memory string illustrated in FIG. 1 comprises n memory cells. A drain of the top memory cell MC1 of the memory string is coupled to a bit line (BL), and a source of the bottom memory cell MCn is coupled to an array common source (ACS). A letter P in a circular box representing a memory cell represents that the memory cell is in a program state, and a letter E in a circular box representing a memory cell represents that the memory cell is in an erase state.

FIG. 1 illustrates a schematic diagram of an operation state of the top memory cell MC1 of the memory string in two cases. As shown in diagram (a) in FIG. 1, in the first case, after a program operation is only performed on one memory cell (i.e., the top memory cell MC1) of the memory string, the memory cell is read. At this time, in a read operation process, the top memory cell MC1 of the memory string is a selected memory cell (Sel cell), and other memory cells (i.e., memory cells MC2 to MCn) of the memory string are unselected memory cells (Unsel cells).

As shown in diagram (b) in FIG. 1, in the second case, after a program operation is performed on all the memory cells (i.e., memory cells MC1 to MCn) of the memory string, the top memory cell MC1 is read. At this time, in the read operation process, the top memory cell MC1 of the memory string is a selected memory cell, and other memory cells (i.e., memory cells MC2 to MCn) of the memory string are unselected memory cells. As compared with a threshold voltage of the memory cell MC1 illustrated in diagram (a) in FIG. 1, a threshold voltage of the memory cell MC1 illustrated in diagram (b) in FIG. 1 has a forward deviation.

It is noted that a minimum unit of the program operation and the read operation is page. For a single-level cell (SLC), each memory cell may store 1 bit of information such that information stored by a layer of memory cells on a physical level corresponds to 1 page of information; for a multi-level cell (MLC), each memory cell can store 2 bits of information such that information stored by a layer of memory cells on a physical level corresponds to 2 pages of information; for a triple-level cell (TLC), each memory cell can store 3 bits of information such that information stored by a layer of memory cells on a physical level corresponds to 3 pages of information; and for a quad-level cell, each memory cell can store 4 bits of information such that information stored by a layer of memory cells on a physical level corresponds to 4 pages of information.

In fact, performing the program operation on the selected memory cell of the memory string refers to performing the program operation on a layer of memory cells within a memory block where the selected memory cell is located, and performing the read operation on the selected memory cell of the memory string refers to performing the read operation on a layer of memory cells within the memory block where the selected memory cell is located. Thus, after the program operation is performed on the selected memory cell, there exists a distribution range for the threshold voltage of the memory cell. In the examples of the present disclosure, performing the read operation on the memory cells at different positions of the memory string refers to performing the read operation on the memory cells on different layers within the memory block. For ease of description, an illustration is made below by taking one memory string within the memory block as an example.

Figure 2:
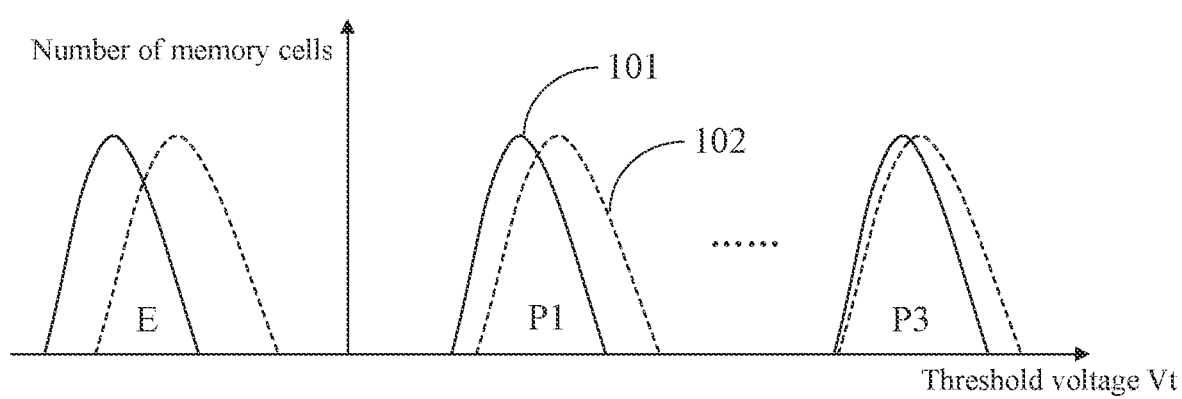
FIG. 2 is a schematic diagram of threshold voltage distribution broadening of memory cells due to a background pattern dependency effect.

Referring to FIG. 2, FIG. 2 is a schematic diagram of threshold voltage distribution broadening of memory cells due to a background pattern dependency effect. As shown in FIG. 2, the abscissa represents the threshold voltage (Vt) of the memory cells, and the ordinate represents the number of memory cells. Taking a multi-level cell technology as an example, FIG. 2 illustrates four threshold voltage distributions of the memory cells, which are E state, P1 state, P2 state (not shown in FIG. 2) and P3 state respectively. The E state corresponds to an erase state, and the P1 state, the P2 state and the P3 state are program states.

Solid lines 101 in FIG. 2 correspond to threshold voltage distribution curves of a top memory cell MC1 of the memory string when the program operation is only performed on the memory cell MC1, and the other memory cells (i.e., memory cells MC2 to MCn) of the memory string are in the erase state, as illustrated in diagram (a) in FIG. 1. Dashed lines 102 in FIG. 2 correspond to threshold voltage distribution curves of the memory cell MC1 when the program operation is performed on all the memory cells of the memory string, and all the memory cells (i.e., the memory cells MC1 to MCn) of the memory string are in the program state, as illustrated in diagram (b) in FIG. 1.

It is noted that the threshold voltage distribution curves of the adjacent states have a certain distance therebetween, and this distance refers to a difference between a minimum value of a threshold voltage distribution of a higher state and a maximum value of a threshold voltage distribution of a lower state. This distance may be used to represent a read window margin of a lower state of the adjacent states. If this distance is small, the read window margin is small; and if this distance is large, the read window margin is large. When all the memory cells of the memory string are in the program state, the background pattern dependency effect results in distribution broadening of the threshold voltage, causing reduction of the read window margin, which easily leads to read disturb. The earlier the program order of the memory cell is, the greater the impact of the background pattern dependency effect on the memory cell is, and the larger the forward deviation of the threshold voltage distribution of the memory cell is.

Figure 3:
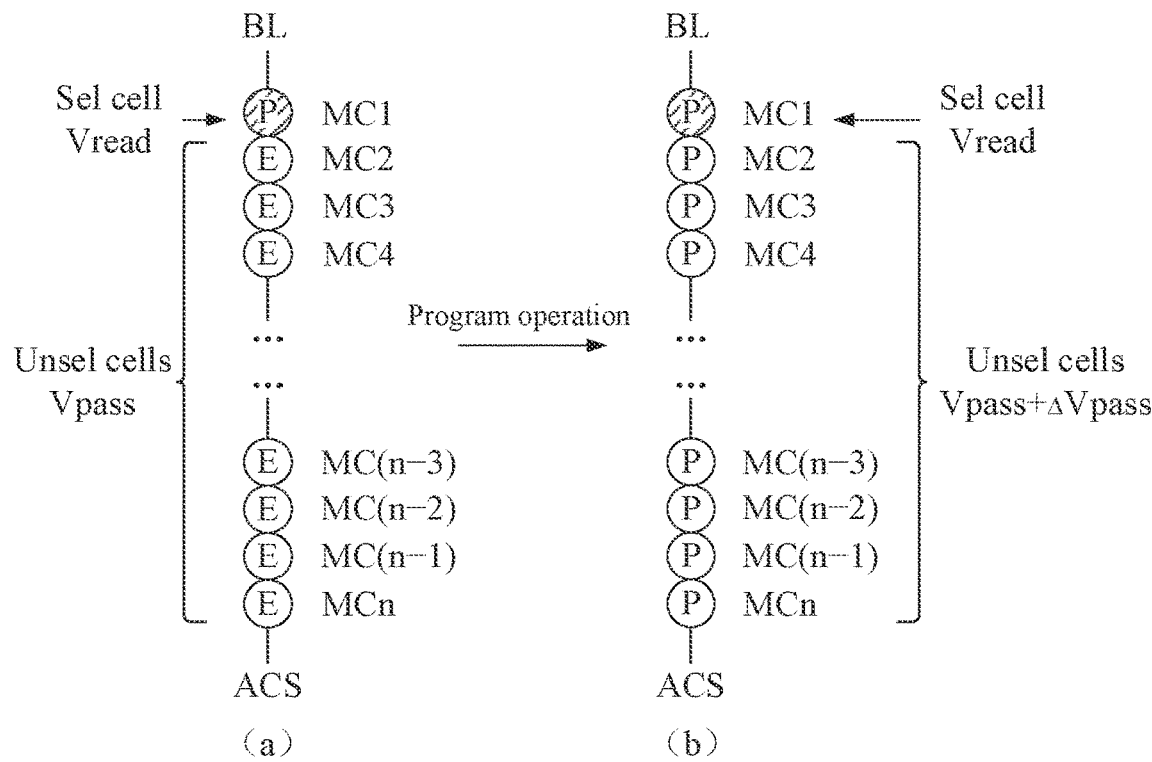
FIG. 3 is a schematic diagram of performing a read operation on memory cells in different cases.

Referring to FIG. 3, FIG. 3 is a schematic diagram of performing a read operation on memory cells in different cases. Diagram (a) in FIG. 3 is a schematic diagram of performing a read operation on memory cells in the memory string as illustrated in diagram (a) in FIG. 1. As shown in diagram (a) in FIG. 3, after the program operation is only performed on one memory cell of the memory string, when reading the memory cell, a read voltage Vread is applied to a word line coupled to the selected memory cell (i.e., the top memory cell MC1), while a pass voltage Vpass is applied to word lines coupled to other unselected memory cells (i.e., the memory cells MC2 to MCn). Diagram (b) in FIG. 3 is a schematic diagram of performing a read operation on the memory cells in the memory string as illustrated in diagram (b) in FIG. 1. As shown in diagram (b) in FIG. 3, after the program operation is performed on all the memory cells (i.e., the memory cells MC1 to MCn) of the memory string, when reading the memory cell, a read voltage Vread is applied to a word line coupled to the selected memory cell (i.e., the top memory cell MC1), while a pass voltage Vpass+ΔVpass is applied to word lines coupled to other unselected memory cells (i.e., the memory cells MC2 to MCn). As such, the pass voltage (i.e., Vpass+ΔVpass) applied to the word lines coupled to the unselected memory cells when the read operation is performed on the memory cells of the memory string as illustrated in diagram (b) in FIG. 3 is greater than the pass voltage (i.e., Vpass) applied to the word lines coupled to the unselected memory cells when the read operation is performed on the memory cells of the memory string as illustrated in diagram (a) in FIG. 3.

It is noted that the pass voltage applied to the word lines coupled to the unselected memory cells may be increased, i.e., the pass voltage is increased from Vpass to Vpass+ΔVpass, thus reducing the impact of the background pattern dependency effect. However, such method may inevitably result in the read disturb and even increase the impact of the read disturb while reducing the forward deviation of the threshold voltage caused by the background pattern dependency effect. Here, the read disturb refers to an effect of weak program caused by applying the pass voltage to the word line coupled to the unselected memory cell while applying the read voltage to the word line coupled to the selected memory cell, thus forming a strong electric field between a gate of the unselected memory cell and a channel such that electrons may enter a charge trap layer of the unselected memory cell.

Figure 4:
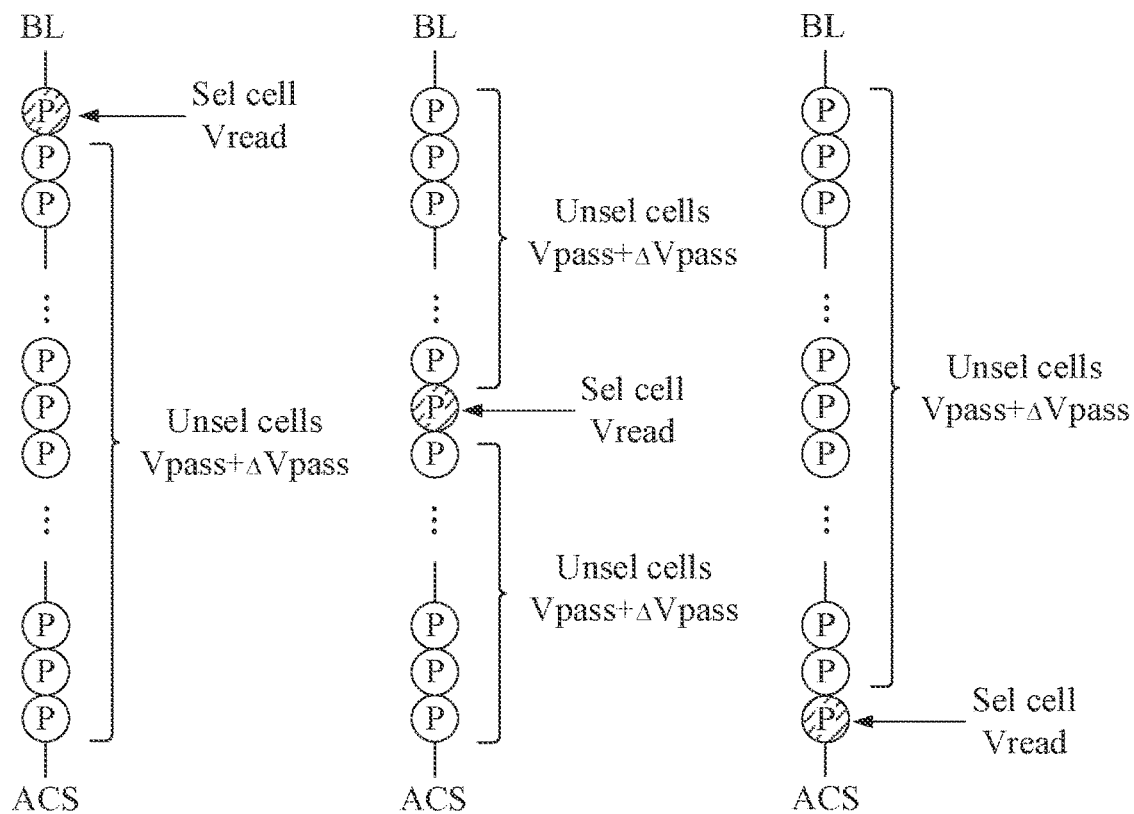
FIG. 4 is a schematic diagram of performing a read operation on different memory cells of a memory string.

Referring to FIG. 4, FIG. 4 is a schematic diagram of performing a read operation on different memory cells of a memory string. FIG. 4 illustrates a schematic diagram of performing a read operation on memory cells of a memory string at three different positions. In a first case, when the memory cells on an upper layer of the memory string are read, the pass voltage Vpass+ΔVpass is applied to the word lines coupled to the unselected memory cells; in a second case, when the memory cells on an intermediate layer of the memory string are read, the pass voltage Vpass+ΔVpass is applied to the word lines coupled to the unselected memory cells; and in a third case, when the memory cells on a lower layer of the memory string are read, the pass voltage Vpass+ΔVpass is applied to the word lines coupled to the unselected memory cells. As such, when the memory cells at different positions of the memory string are read, the pass voltages applied to the word lines coupled to the unselected memory cells are the same.

It is noted that the earlier the program order of the memory cell is, the greater the impact of the background pattern dependency effect on the memory cell is, and the larger the forward deviation of the threshold voltage distribution of the memory cell is. That is, the memory cells at the different positions of the same memory string experience different degrees of impact of the background pattern dependency effect, and the forward deviations of their threshold voltage distributions are different. However, when the memory cells at the different positions of the memory string are read, the pass voltages applied to the word lines coupled to the unselected memory cells are the same, thus being unfavorable to reduce the read disturb.

Referring to FIG. 5, FIG. 5 is a flow diagram of an operation method of a memory provided by examples of the present disclosure. As shown in FIG. 5, the examples of the present disclosure provide an operation method of a memory; the memory comprises a plurality of memory strings, each of which comprises a plurality of memory cells; and the operation method comprises:

Step S501: applying a pass voltage to word lines coupled to unselected memory cells of one of the memory strings according to a program order of a selected memory cell of the memory string when performing a read operation on the selected memory cell, wherein the earlier the program order of the selected memory cell is, the greater the pass voltage applied to the word lines coupled to the unselected memory cells of the memory string during the read operation is.

As described earlier, the earlier the program order of the memory cell is, the greater the impact of the background pattern dependency effect on the memory cell is, and the larger the forward deviation of the threshold voltage distribution of the memory cell is. In the examples of the present disclosure, the pass voltage applied to the word lines coupled to the unselected memory cells is determined according to the program order of the selected memory cell, i.e., according to different degrees of impact of the background pattern dependency effect experienced by the selected memory cell, such that the impact of the background pattern dependency effect can be decreased, and the read disturb is reduced.

Specifically, the memory cell that is earlier in program order experiences the larger degree of impact of the background pattern dependency effect; the forward deviation of the threshold voltage distribution of the memory cell is larger; and when the memory cell is read, the pass voltage applied to the word lines coupled to the unselected memory cells is larger, which can increase a current. The memory cell that is later in program order experiences the smaller degree of impact of the background pattern dependency effect; the forward deviation of the threshold voltage distribution of the memory cell is smaller; and when the memory cell is read, the pass voltage applied to the word lines coupled to the unselected memory cells is smaller, which can also increase the current. Here, when reading the memory cell that is earlier in program order and the memory cell that is later in program order, the current can be increased by adjusting the pass voltage applied to the word lines coupled to the unselected memory cells of the memory string, but a degree of increase of the current has a difference. Specifically, the earlier the program order of the selected memory cell is, the greater the pass voltage applied to the word lines coupled to the unselected memory cells of the memory string is, and the larger the degree of the increase of the current is; the later the program order of the selected memory cell is, the smaller the pass voltage applied to the word lines coupled to the unselected memory cells of the memory string is, and the smaller the degree of the increase of the current is. Thus, the pass voltage applied to the word lines coupled to the unselected memory cells is determined according to the different degrees of impact of the background pattern dependency effect experienced by the selected memory cells, such that the impact of the background pattern dependency effect can be decreased, and the read disturb is reduced.

It is noted that the pass voltage applied to the word lines coupled to the unselected memory cells is different according to the different degrees of impact of the background pattern dependency effect experienced by the selected memory cell here. If the selected memory cell is the last memory cell being programmed in the memory string, the selected memory cell is not affected by the background pattern dependency effect, and at this time, the pass voltage applied to the word lines coupled to the unselected memory cells is minimum, i.e., Vpass-min. Thus, as compared with the selected memory cell being the last memory cell being programmed in the memory string, when the selected memory cell is another memory cell in the memory string, the pass voltages applied to the word lines coupled to the unselected memory cells are all greater than Vpass-min, which can increase the current.

In the examples of the present disclosure, before performing the read operation on the selected memory cell of one of the memory strings, the operation method further comprises: performing a program operation on the plurality of memory cells of the memory string.

Here, before performing the read operation on the memory cells of the memory string, there is a need to perform the program operation on the memory cells of the memory string. For a program process of the memory, the program operation includes a forward program operation and a reverse program operation. The forward program operation refers to program from the bottom up starting from a bottom memory cell closest to a bottom selective transistor (BST) and ending at a top memory cell closest to a top selective transistor (TST). The reverse program operation refers to program from the top down starting from a top memory cell closest to a top selective transistor and ending at a bottom memory cell closest to a bottom selective transistor. The bottom selective transistor is also called a source selective transistor (SST), and the top selective transistor is also called a drain selective transistor (DST).

Referring to FIG. 6, FIG. 6 is a schematic diagram I of performing a read operation after forward program of memory cells provided by examples of the present disclosure. As shown in FIG. 6, in the examples of the present disclosure, in the case that the program operation is the forward program operation, applying the pass voltage to the word lines coupled to the unselected memory cells of one of the memory strings according to the program order of the selected memory cell of the memory string when performing the read operation on the selected memory cell, comprises: when performing the read operation on the selected memory cell (i.e., Sel cell) of one of the memory strings, the smaller the number of the unselected memory cells between the selected memory cell and the source selective transistor SST is, the greater the pass voltage applied to the word lines coupled to the unselected memory cells (i.e., Unsel cells) of the memory string is.

Here, when the program operation is the forward program operation, the program starts from the bottom memory cell MCn closest to the source selective transistor SST and ends at the top memory cell MC1 closest to the drain selective transistor DST from the bottom up. In other words, in the case that the program operation is the forward program operation, the program order of the bottom memory cell MCn is earliest, and the degree of impact of the background pattern dependency effect experienced by it is greatest; the program order of the top memory cell MC1 is latest, and the degree of impact of the background pattern dependency effect experienced by it is smallest (or, it is not affected by the background pattern dependency effect). The degree of impact of the background pattern dependency effect experienced by the memory cells is increasingly smaller from the bottom memory cell MCn to the top memory cell MC1. That is, the smaller the number of the unselected memory cells between the selected memory cell and the source selective transistor is, the larger the degree of impact of the background pattern dependency effect experienced by the selected memory cell is, and the larger the forward deviation of its threshold voltage distribution is.

FIG. 6 illustrates applying a pass voltage Vpass,1 to the word lines coupled to the unselected memory cells (i.e., the memory cells MC1 to MC(n−1)) when performing the read operation on the memory cell MCn; applying a pass voltage Vpass,2 to the word lines coupled to the unselected memory cells (i.e., the memory cell MCn and the memory cells MC1 to MC(n−2)) when performing the read operation on the memory cell MC(n−1); and applying a pass voltage Vpass,3 to the word lines coupled to the unselected memory cells (i.e., the memory cell MCn, the memory cell MC(n−1), and the memory cells MC1 to MC(n−3)) when performing the read operation on the memory cell MC(n−2), wherein Vpass,1>Vpass,2>Vpass,3.

Figure 7:
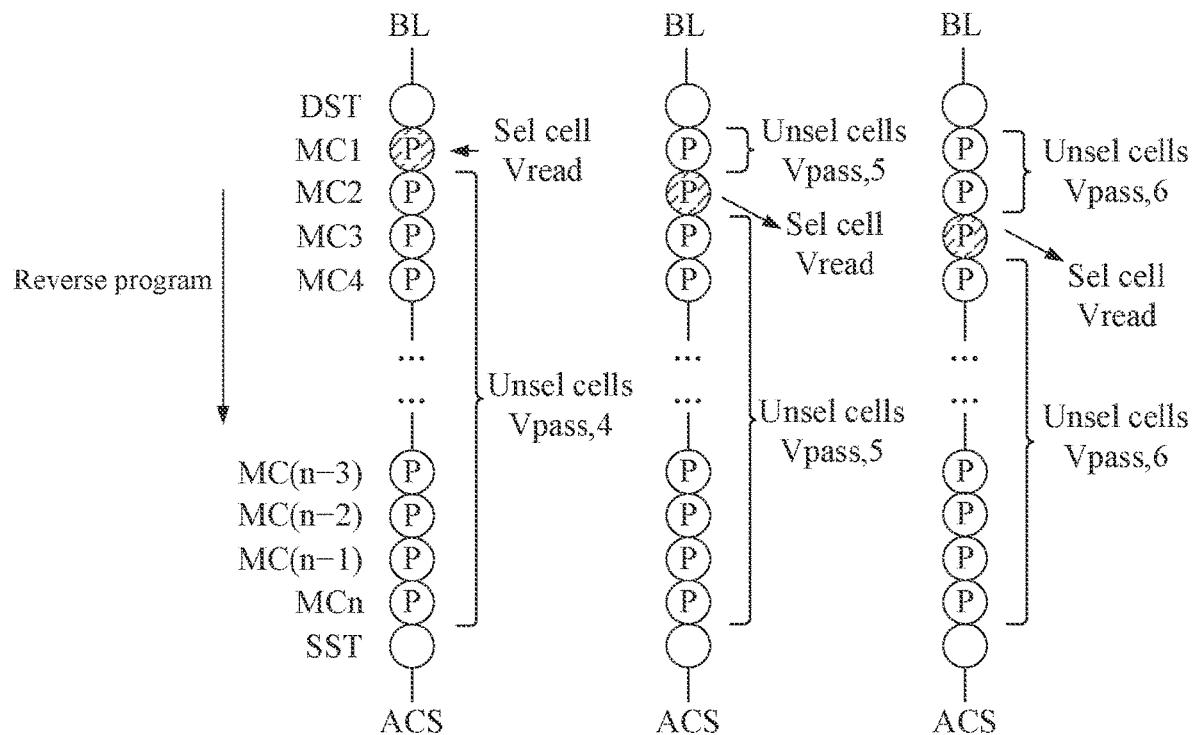
FIG. 7 is a schematic diagram I of performing a read operation after reverse program of memory cells provided by examples of the present disclosure.

Referring to FIG. 7, FIG. 7 is a schematic diagram I of performing a read operation after reverse program of memory cells provided by examples of the present disclosure. As shown in FIG. 7, in the examples of the present disclosure, in the case that the program operation is the reverse program operation, applying the pass voltage to the word lines coupled to the unselected memory cells of one of the memory strings according to the program order of the selected memory cell of the memory string when performing the read operation on the selected memory cell, comprises: when performing the read operation on the selected memory cell (i.e., Sel cell) of one of the memory strings, the smaller the number of the unselected memory cells between the selected memory cell and the drain selective transistor DST is, the greater the pass voltage applied to the word lines coupled to the unselected memory cells (i.e., Unsel cells) of the memory string is.

Here, when the program operation is the reverse program operation, the program starts from the top memory cell MC1 closest to the drain selective transistor DST and ends at the bottom memory cell MCn closest to the source selective transistor SST from the top down. In other words, in the case that the program operation is the reverse program operation, the program order of the top memory cell MC1 is earliest, and the degree of impact of the background pattern dependency effect experienced by it is greatest; the program order of the bottom memory cell MCn is latest, and the degree of impact of the background pattern dependency effect experienced by it is smallest.

The degree of impact of the background pattern dependency effect experienced by the memory cells is increasingly smaller from the top memory cell MC1 to the bottom memory cell MCn. That is, the smaller the number of the unselected memory cells between the selected memory cell and the drain selective transistor is, the larger the degree of impact of the background pattern dependency effect experienced by the selected memory cell is, and the larger the forward deviation of its threshold voltage distribution is.

FIG. 7 illustrates applying a pass voltage Vpass,4 to the word lines coupled to the unselected memory cells (i.e., the memory cells MC2 to MC(n−1)) when performing the read operation on the memory cell MC1; applying a pass voltage Vpass,5 to the word lines coupled to the unselected memory cells (i.e., the memory cell MC1 and the memory cells MC3 to MCn) when performing the read operation on the memory cell MC2; and applying a pass voltage Vpass,6 to the word lines coupled to the unselected memory cells (i.e., the memory cell MC1, the memory cell MC2, and the memory cells MC4 to MCn) when performing the read operation on the memory cell MC3, wherein Vpass,4>Vpass,5>Vpass,6.

Figure 8:
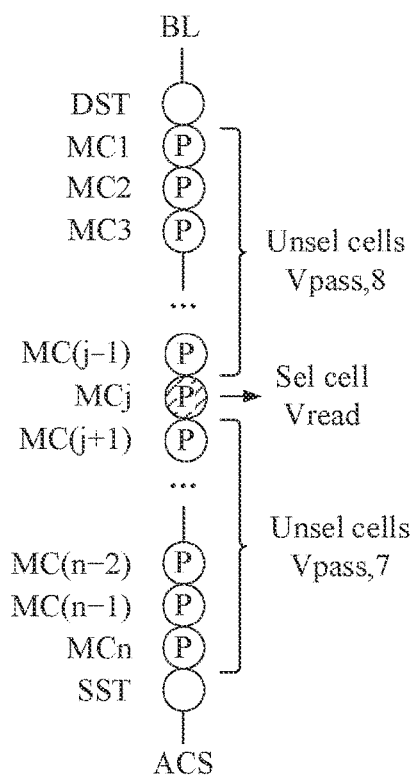
FIG. 8 is a schematic diagram of performing a read operation after program of memory cells provided by examples of the present disclosure.

Referring to FIG. 8, FIG. 8 is a schematic diagram of performing a read operation after program of memory cells provided by examples of the present disclosure. As shown in FIG. 8, in the examples of the present disclosure, the operation method comprises: when performing a read operation on a selected memory cell (i.e., a memory cell MCj) of one of the memory strings, a pass voltage Vpass,7 applied to word lines coupled to first unselected memory cells (i.e., memory cells MC(j+1) to MCn) of the memory string is greater than a pass voltage Vpass,8 applied to word lines coupled to second unselected memory cells (i.e., memory cells MC1 to MC(j−1)) of the memory string, wherein the first unselected memory cells include unselected memory cells between the selected memory cell (i.e., the memory cell MCj) and the source selective transistor SST, and the second unselected memory cells include unselected memory cells between the selected memory cell (i.e., the memory cell MCj) and the drain selective transistor DST.

As described earlier, the pass voltage applied to the word lines coupled to the unselected memory cells when performing the read operation on the selected memory cell may be determined according to the program order of the selected memory cell (i.e., the memory cell MCj). Here, the unselected memory cells of the memory string may be divided into the first unselected memory cells and the second unselected memory cells according to the selected memory cell of the memory string, wherein the first unselected memory cells are closer to the source selective transistor SST, and the second unselected memory cells are closer to the drain selective transistor DST. Considering different contributions of a source terminal resistance and a drain terminal resistance to a current, different pass voltages are applied to the first unselected memory cells closer to a source terminal and the second unselected memory cells closer to a drain terminal.

Figure 9:
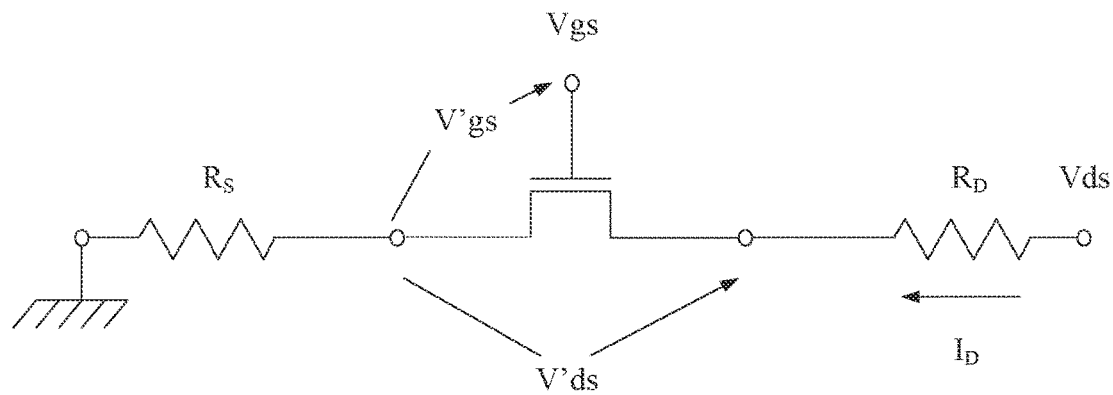
FIG. 9 is a schematic circuit diagram of a memory string provided by examples of the present disclosure.

Referring to FIG. 9, FIG. 9 is a schematic circuit diagram of a memory string provided by examples of the present disclosure. Different contributions of the source terminal resistance and the drain terminal resistance of the memory string to the current will be described in detail below in conjunction with FIG. 9. A plurality of memory cells of the memory string are connected in series, and a circuit of the memory string may be equivalent to the schematic circuit diagram as shown in FIG. 9. FIG. 9 illustrates a selected memory cell of the memory string. A drain terminal current of the memory string is labeled as ID, a series resistance of unselected memory cells (i.e., the first unselected memory cells) between the selected memory cell and the source selective transistor of the memory string is labeled as RS, and a series resistance of unselected memory cells (i.e., the second unselected memory cells) between the selected memory cell and the drain selective transistor of the memory string is labeled as RD. FIG. 9 further illustrates a theoretical voltage difference, labeled as Vds, between a drain and a source of the selected memory cell, and a theoretical voltage difference, labeled as Vgs, between a gate and the source of the selected memory cell. The drain terminal current ID of the memory string may be calculated using the following Equation 1.

$$I_D = k * [(V'gs - Vt) * V'ds] \qquad \text{(Equation 1)}$$

where $I_D$ is the drain terminal current of the memory string, k is a fixed parameter value, V'gs is an effective voltage difference between the gate and the source of the selected memory cell, Vt is a threshold voltage of the selected memory cell, and V'ds is an effective voltage difference between the drain and the source of the selected memory cell.

Due to a parasitic resistance, the theoretical voltage difference Vds and the effective voltage difference V'ds between the drain and the source of the selected memory cell has a difference, and the theoretical voltage difference Vgs and the effective voltage difference V'gs between the gate and the source of the selected memory cell also has a difference. Referring to Equation 1, the drain terminal current ID of the memory string can be calculated according to the effective voltage difference V'gs between the gate and the source of the selected memory cell, the threshold voltage Vt of the selected memory cell, and the effective voltage difference V'ds between the drain and the source of the selected memory cell of the memory string. The effective voltage difference V'gs between the gate and the source of the selected memory cell and the effective voltage difference V'ds between the drain and the source of the selected memory cell of the memory string both relate to the source terminal resistance that has a greater contribution to the drain terminal current ID. Thus, when the read operation is performed on the selected memory cell, the pass voltage applied to the first unselected memory cells closer to the source terminal is greater than the pass voltage applied to the second unselected memory cells closer to the drain terminal. As such, the impact of the background pattern dependency effect can be improved better, and the read disturb is reduced.

In the examples of the present disclosure, when the read operation is performed on the selected memory cell, the pass voltage applied to the word lines coupled to the unselected memory cells may be controlled in groups according to the different degrees of impact of the background pattern dependency effect experienced by the selected memory cell, thereby decreasing the impact of the background pattern dependency effect. When the read operation is performed on the selected memory cell, if the selected memory cell is seriously affected by the background pattern dependency effect, a larger pass voltage is applied to the word lines coupled to the unselected memory cells of the memory string to increase the current. If the selected memory cell is slightly affected by the background pattern dependency effect, a smaller pass voltage is applied to the word lines coupled to the unselected memory cells of the memory string to increase the current. Thus, the impact of the background pattern dependency effect is decreased, and the read disturb may be reduced at the same time. Controlling the pass voltage in the read operation process in groups can more specifically improve the problem of the impact of the background pattern dependency effect experienced by the memory cells in different memory groups. In addition, with the increase of the number of stacked layers of the memory, the number of reads will also increase. In the examples of the present disclosure, the problem of the read disturb can also be reduced by controlling the pass voltage in groups.

In the examples of the present disclosure, before performing the read operation on the selected memory cell of one of the memory strings, the operation method further comprises: the plurality of memory cells of the memory string are divided into a plurality of memory groups according to the program order.

Here, each memory group may include at least one memory cell. In other words, the number of the memory groups is less than or equal to the number of the memory cells. The examples of the present disclosure have no special limitation to the number of the memory groups, and also have no special limitation to the number of the memory cells in the memory groups. In some examples, the number of the memory cells in each memory group may be the same. In some other examples, the number of the memory cells in each memory group may also be different.

Figure 10:
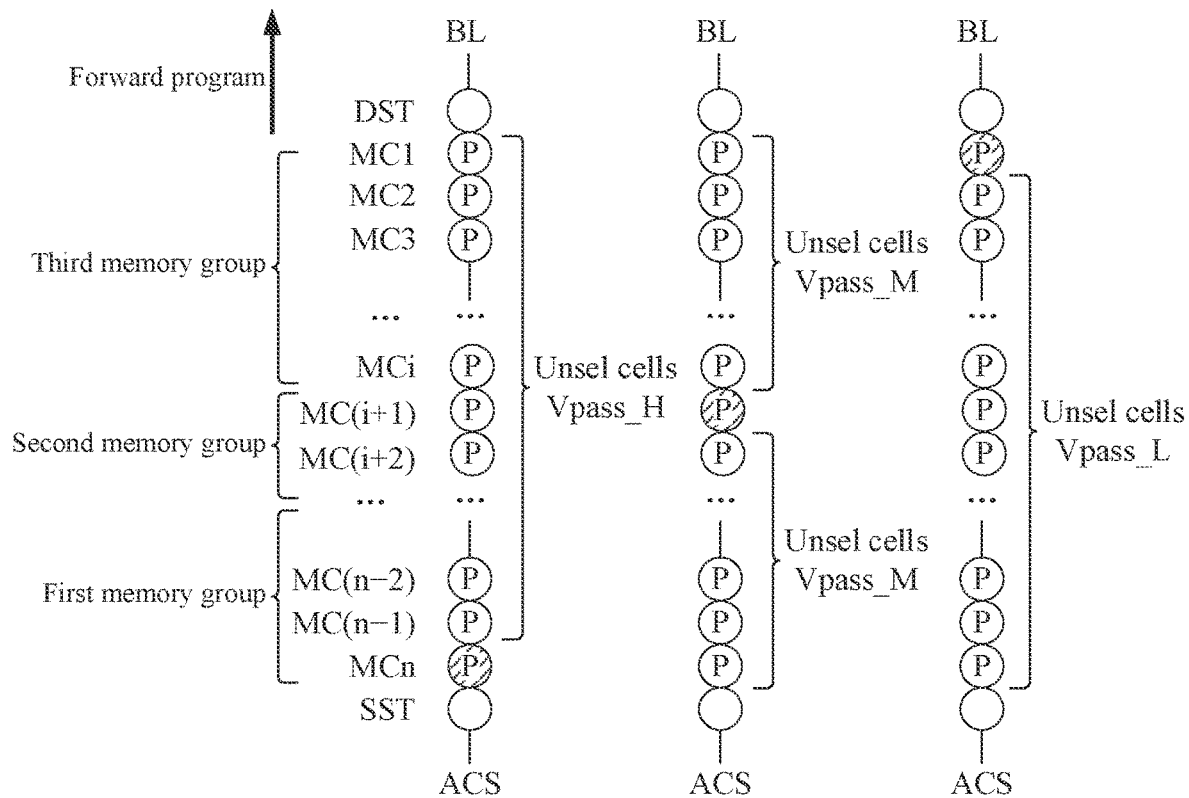
FIG. 10 is a schematic diagram II of performing a read operation after forward program of memory cells provided by examples of the present disclosure.
Figure 11:
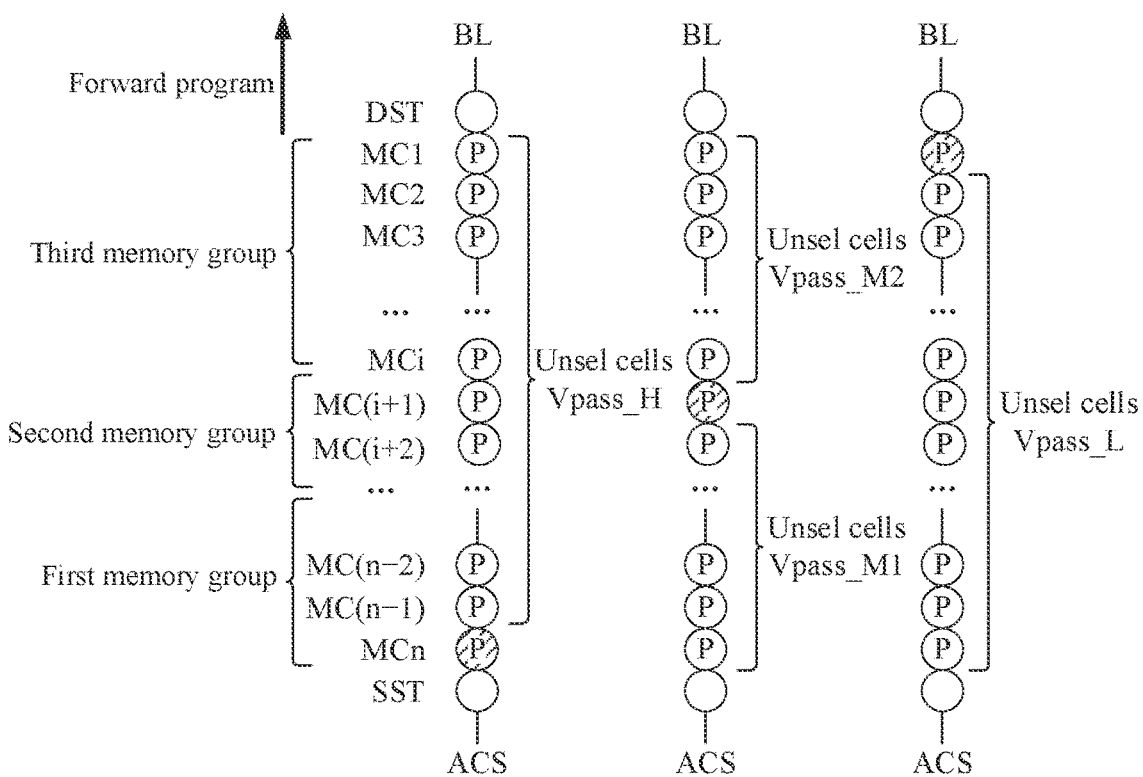
FIG. 11 is a schematic diagram III of performing a read operation after forward program of memory cells provided by examples of the present disclosure.
Figure 12:
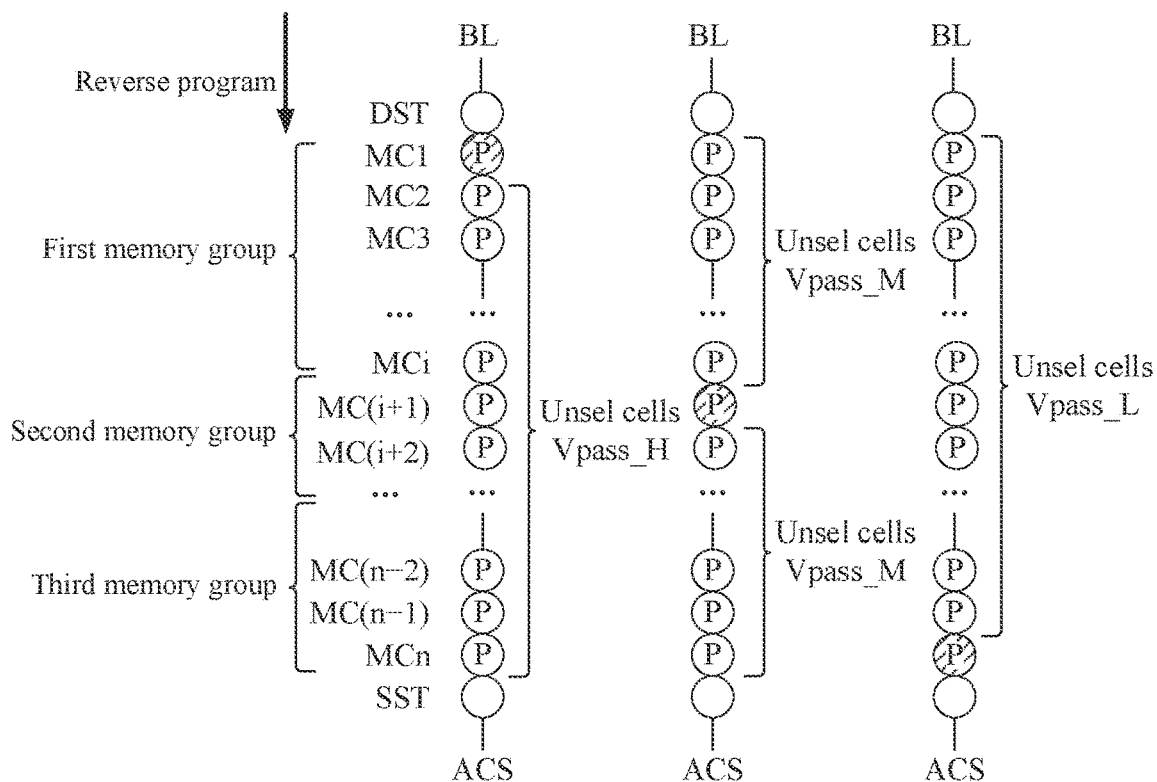
FIG. 12 is a schematic diagram II of performing a read operation after reverse program of memory cells provided by examples of the present disclosure.
Figure 13:
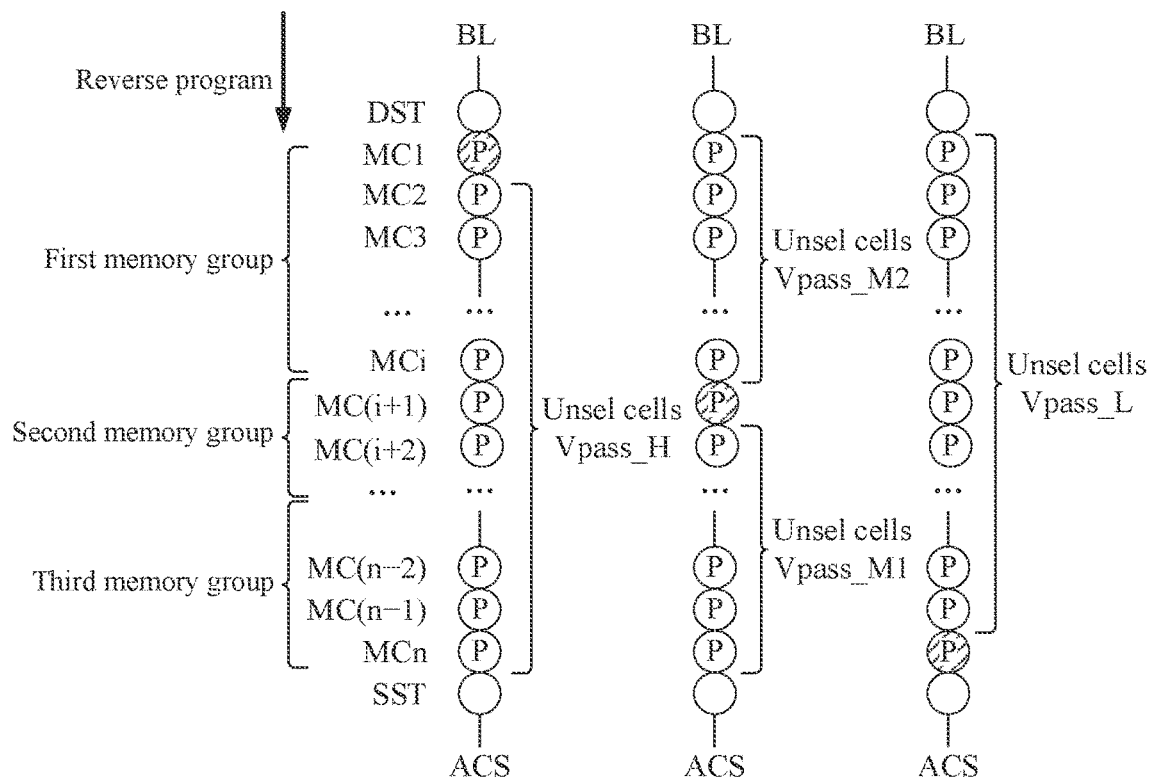
FIG. 13 is a schematic diagram III of performing a read operation after reverse program of memory cells provided by examples of the present disclosure.

Referring to FIGS. 10 and 11, FIGS. 10 and 11 are schematic diagrams II and III of performing a read operation after forward program of memory cells provided by examples of the present disclosure respectively. Referring to FIGS. 12 and 13, FIGS. 12 and 13 are schematic diagrams II and III of performing a read operation after reverse program of memory cells provided by examples of the present disclosure respectively. As shown in FIGS. 10, 11, 12 and 13, in the examples of the present disclosure, dividing the plurality of memory cells of the memory string into a plurality of memory groups according to the program order, comprises: dividing the plurality of memory cells of the memory string into a first memory group, a second memory group and a third memory group according to the program order; wherein a program order of the first memory group is earlier than a program order of the second memory group, and a program order of the second memory group is earlier than a program order of the third memory group; applying a first pass voltage Vpass_H to the word lines coupled to the unselected memory cells of the memory string during the read operation in the case that the selected memory cell belongs to the first memory group; applying a second pass voltage Vpass_M to the word lines coupled to the unselected memory cells of the memory string during the read operation in the case that the selected memory cell belongs to the second memory group; and applying a third pass voltage Vpass_L to the word lines coupled to the unselected memory cells of the memory string during the read operation in the case that the selected memory cell belongs to the third memory group; wherein the first pass voltage Vpass_H is greater than the second pass voltage Vpass_M, and the second pass voltage Vpass_M is greater than the third pass voltage Vpass_L.

As shown in FIGS. 10 and 11, in the examples of the present disclosure, in the case that the program operation is the forward program operation, the first memory group is close to the source selective transistor SST, and the third memory group is close to the drain selective transistor DST. The smaller the number of the unselected memory cells between the selected memory cell and the source selective transistor SST is, the greater the pass voltage applied to the word lines coupled to the unselected memory cells is when the read operation is performed on the selected memory cell. Taking what is shown in FIGS. 10 and 11 as an example, the memory string is divided into three memory groups according to the program order or according to the degree of impact of the background pattern dependency effect experienced by the memory cells, wherein the third memory group includes memory cells MC1 to MCi, a total of i memory cells, the second memory group includes memory cells MC(i+1) to MC(i+j), a total of j memory cells, and the first memory group includes memory cells MC(i+j+1) to MCn, a total of (n−i−j). Neither FIG. 10 nor FIG. 11 shows the memory cell MC(i+j) and the memory cell MC(i+j+1).

As shown in FIG. 10, in the case that the selected memory cell (e.g., the memory cell MCn) belongs to the first memory group, the first pass voltage Vpass_H is applied to the word lines coupled to the unselected memory cells of the memory string during the read operation; at this time, the unselected memory cells include all the memory cells of the second memory group and the third memory group, and other memory cells of the first memory group, i.e., the unselected memory cells include the memory cells MC1 to MC(n−1). In the case that the selected memory cell (e.g., the memory cell MC(i+1)) belongs to the second memory group, the second pass voltage Vpass_M is applied to the word lines coupled to the unselected memory cells of the memory string during the read operation; at this time, the unselected memory cells include all the memory cells of the first memory group and the third memory group, and other memory cells of the second memory group, i.e., the unselected memory cells include the memory cells MC1 to MCi and the memory cells MC(i+2) to MCn. In the case that the selected memory cell (e.g., the memory cell MC1) belongs to the third memory group, the third pass voltage Vpass_L is applied to the word lines coupled to the unselected memory cells of the memory string during the read operation; at this time, the unselected memory cells include all the memory cells of the first memory group and the second memory group, and other memory cells of the third memory group, i.e., the unselected memory cells include the memory cells MC2 to MCn. The first pass voltage Vpass_H is greater than the second pass voltage Vpass_M, and the second pass voltage Vpass_M is greater than the third pass voltage Vpass_L. Here, the specific voltage magnitudes of the first pass voltage Vpass_H, the second pass voltage Vpass_M and the third pass voltage Vpass_L may be regulated according to actual situations.

As shown in FIG. 11, in the examples of the present disclosure, in the case that the selected memory cell (e.g., the memory cell MC(i+1)) belongs to the second memory group, a first sub pass voltage Vpass_M1 is applied to the word lines coupled to the unselected memory cells between the selected memory cell and the source selective transistor SST during the read operation, and a second sub pass voltage Vpass_M2 is applied to the word lines coupled to the unselected memory cells between the selected memory cell and the drain selective transistor DST during the read operation, wherein the first sub pass voltage Vpass_M1 is greater than the second sub pass voltage Vpass_M2. Here, the specific voltage magnitudes of the first sub pass voltage Vpass_M1 and the second sub pass voltage Vpass_M2 may be regulated according to actual situations.

Here, when the selected memory cell belongs to the second memory group, since the source terminal resistance and the drain terminal resistance have different contributions to the current, different pass voltages may be applied to the word lines coupled to the unselected memory cells between the selected memory cell and the source selective transistor SST and the word lines coupled to the unselected memory cells between the selected memory cell and the drain selective transistor DST, i.e., the pass voltage applied to the word lines coupled to the unselected memory cells above the selected memory cell of the memory string and the pass voltage applied to the word lines coupled to the unselected memory cells below the selected memory cell of the memory string are different. More specifically, the pass voltages applied at this time may employ asymmetrical pass voltages, that is, the pass voltage applied to the word lines coupled to the unselected memory cells closer to the source terminal is greater than the pass voltage applied to the word lines coupled to the unselected memory cells closer to the drain terminal. According to the position of the selected memory cell, the unselected memory cells are divided into unselected memory cells closer to the source terminal and unselected memory cells closer to the drain terminal, and the magnitude of the pass voltage may be regulated according to actual situations. As such, the problem of the read disturb caused by the pass voltage applied to the word lines coupled to part of the memory cells may be further improved, and the impact of the background pattern dependency effect is reduced at the same time.

As shown in FIGS. 12 and 13, in the examples of the present disclosure, in the case that the program operation is the reverse program operation, the first memory group is close to the drain selective transistor DST, and the third memory group is close to the source selective transistor SST. The smaller the number of the unselected memory cells between the selected memory cell and the drain selective transistor DST is, the greater the pass voltage applied to the word lines coupled to the unselected memory cells is when the read operation is performed on the selected memory cell. Taking what is shown in FIGS. 12 and 13 as an example, the memory string is divided into three memory groups according to the program order or according to the degree of impact of the background pattern dependency effect experienced by the memory cells, wherein the first memory group includes memory cells MC1 to MCi, a total of i memory cells, the second memory group includes memory cells MC(i+1) to MC(i+j), a total of j memory cells, and the third memory group includes memory cells MC(i+j+1) to MCn, a total of (n−i−j). Neither FIG. 12 nor FIG. 13 shows the memory cell MC(i+j) and the memory cell MC(i+j+1).

As shown in FIG. 12, in the case that the selected memory cell (e.g., the memory cell MC 1) belongs to the first memory group, the first pass voltage Vpass_H is applied to the word lines coupled to the unselected memory cells of the memory string during the read operation; at this time, the unselected memory cells include all the memory cells of the second memory group and the third memory group, and other memory cells of the first memory group, i.e., the unselected memory cells include the memory cells MC2 to MCn. In the case that the selected memory cell (e.g., the memory cell MC(i+1)) belongs to the second memory group, the second pass voltage Vpass_M is applied to the word lines coupled to the unselected memory cells of the memory string during the read operation; at this time, the unselected memory cells include all the memory cells of the first memory group and the third memory group, and other memory cells of the second memory group, i.e., the unselected memory cells include the memory cells MC1 to MCi and the memory cells MC(i+2) to MCn. In the case that the selected memory cell (e.g., the memory cell MCn) belongs to the third memory group, the third pass voltage Vpass_L is applied to the word lines coupled to the unselected memory cells of the memory string during the read operation; at this time, the unselected memory cells include all the memory cells of the first memory group and the second memory group, and other memory cells of the third memory group, i.e., the unselected memory cells include the memory cells MC1 to MC(n−1). The first pass voltage Vpass_H is greater than the second pass voltage Vpass_M, and the second pass voltage Vpass_M is greater than the third pass voltage Vpass_L. Here, the specific voltage magnitudes of the first pass voltage Vpass_H, the second pass voltage Vpass_M and the third pass voltage Vpass_L may be regulated according to actual situations.

As shown in FIG. 13, in the examples of the present disclosure, in the case that the selected memory cell (e.g., the memory cell MC(i+1)) belongs to the second memory group, a first sub pass voltage Vpass_M1 is applied to the word lines coupled to the unselected memory cells between the selected memory cell and the source selective transistor SST during the read operation, and a second sub pass voltage Vpass_M2 is applied to the word lines coupled to the unselected memory cells between the selected memory cell and the drain selective transistor DST during the read operation, wherein the first sub pass voltage Vpass_M1 is greater than the second sub pass voltage Vpass_M2. Here, the specific voltage magnitudes of the first sub pass voltage Vpass_M1 and the second sub pass voltage Vpass_M2 may be regulated according to actual situations.

Here, when the selected memory cell belongs to the second memory group, since the source terminal resistance and the drain terminal resistance have different contributions to the current, different pass voltages may be applied to the word lines coupled to the unselected memory cells between the selected memory cell and the source selective transistor SST and the word lines coupled to the unselected memory cells between the selected memory cell and the drain selective transistor DST, i.e., the pass voltage applied to the word lines coupled to the unselected memory cells above the selected memory cell of the memory string and the pass voltage applied to the word lines coupled to the unselected memory cells below the selected memory cell of the memory string are different. More specifically, the pass voltages applied at this time may employ asymmetrical pass voltages, that is, the pass voltage applied to the word lines coupled to the unselected memory cells closer to the source terminal is greater than the pass voltage applied to the word lines coupled to the unselected memory cells closer to the drain terminal. According to the position of the selected memory cell, the unselected memory cells are divided into unselected memory cells closer to the source terminal and unselected memory cells closer to the drain terminal, and the magnitude of the pass voltage may be regulated according to actual situations. As such, the problem of the read disturb caused by the pass voltage applied to the word lines coupled to part of the memory cells may be further improved, and the impact of the background pattern dependency effect is reduced at the same time.

Figure 14:
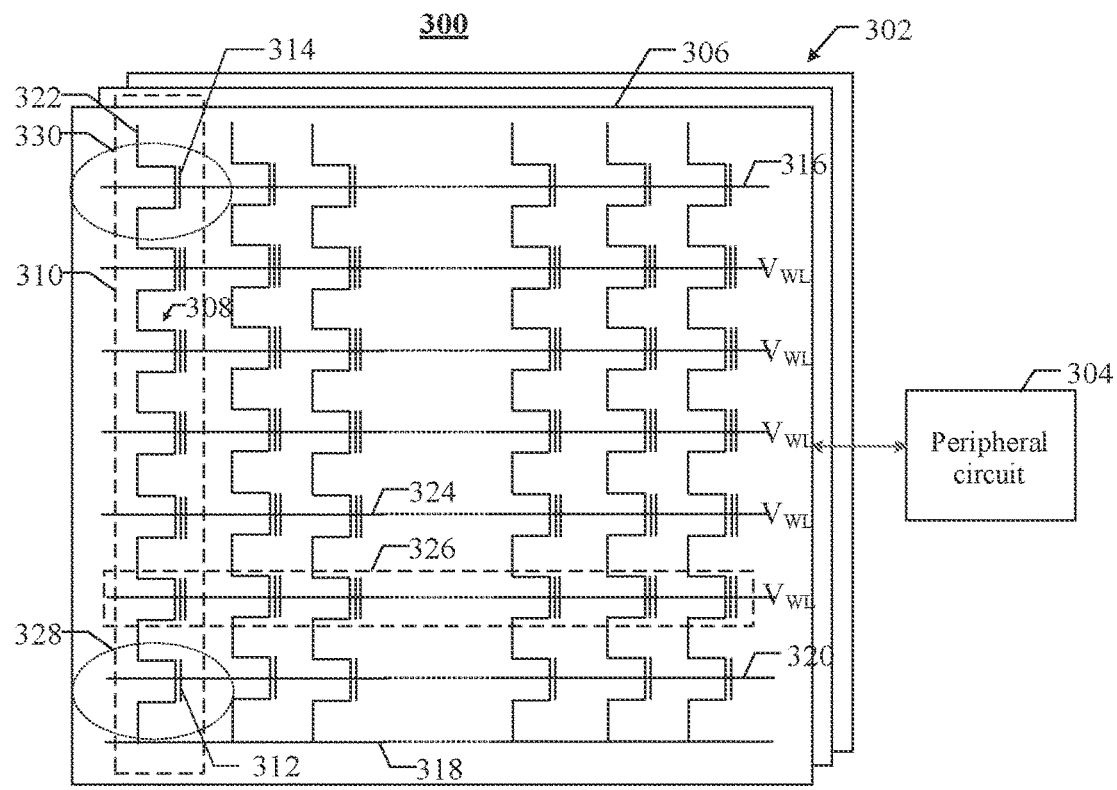
FIG. 14 is a block diagram of a memory comprising a memory cell array and a peripheral circuit provided by examples of the present disclosure.

Referring to FIG. 14, FIG. 14 is a block diagram of a memory comprising a memory cell array and a peripheral circuit provided by examples of the present disclosure. As shown in FIG. 14, in the examples of the present disclosure, the memory 300 comprises: a memory cell array 302 and a peripheral circuit 304 coupled to the memory cell array 302, wherein the memory cell array 302 comprises a plurality of memory strings 310, each of which comprises a plurality of memory cells 308.

As shown in FIG. 14, each memory string 310 may comprise a source selective transistor 328 (as shown by the dashed circular box in FIG. 14) at its source terminal, a drain selective transistor 330 (as shown by the dashed circular box in FIG. 14) at its drain terminal and a plurality of memory cells 308 between the source selective transistor 328 and the drain selective transistor 330, wherein a gate of the source selective transistor 328 is a source selective gate (SSG) 312, and a gate of the drain selective transistor 330 is a drain selective gate (DSG) 314. The source selective gate 312 and the drain selective gate 314 may be configured to activate the selected memory string 310 (i.e., a column of the array) during read and program operations. In some examples, sources of the memory strings 310 in the same memory block 306 are coupled through the same source line (SL) 318, e.g., a common source line. In other words, in some examples, all of the memory strings 310 in the same memory block 306 have an array common source. In some examples, a drain of the drain selective transistor 330 of each memory string 310 is coupled to a respective bit line 322 which the data can be read from or written to via an output bus (not shown in FIG. 14). In some examples, each memory string 310 is configured to be selected or deselected by applying a select voltage (e.g., above the threshold voltage of the drain selective transistor 330) or a deselect voltage (e.g., 0 V) to the respective drain selective gate 314 via one or more drain selective gate lines 316 and/or by applying a select voltage (e.g., above the threshold voltage of the source selective transistor 328) or a deselect voltage (e.g., 0 V) to the respective source selective gate 312 via one or more source selective gate lines 320.

As shown in FIG. 14, the memory strings 310 can be organized into multiple memory blocks 306, each of which may have a source line 318, e.g., a common source line coupled to the ground. In some examples, each memory block 306 is the minimum unit for erase operations, i.e., all of the memory cells 308 on the same memory block 306 are erased at the same time. In order to erase the memory cells 308 in a selected memory block, the source lines 318 coupled to the selected memory block as well as unselected memory blocks that are in the same plane as the selected memory block can be biased with an erase voltage Vers, such as a high positive voltage (e.g., 20 V or higher). It is to be understood that in some examples, an erase operation may be performed at a half memory block level, a quarter memory block level, or a level having any suitable number of memory blocks or any suitable fractions of a memory block. The memory cells 308 of adjacent memory strings 310 may be coupled through word lines 324 that select which row of memory cells 308 is affected by read and program operations. In some examples, each word line 324 is coupled to a memory page 326 of the memory cell 308, memory page 326 being the minimum unit for program operations. The size of one memory page 326 in bits can relate to the number of memory strings 310 coupled by the word line 324 in one memory block 306. Each word line 324 may include a plurality of control gates at each memory cell 308 in the respective memory page 326 and a gate line coupling the control gates.

With continued reference to FIG. 14, the peripheral circuit 304 may be coupled to the memory cell array 302 through bit lines 322, word lines 324, source lines 318, source selective gate lines 320 and drain selective gate lines 316. The peripheral circuit 304 may include any suitable analog, digital, and hybrid signal circuits for facilitating the operations of the memory cell array 302 by applying and sensing voltage signals and/or current signals to and from each target memory cell 308 via the bit lines 322, the word lines 324, the source lines 318, the source selective gate lines 320, and the drain selective gate lines 316. The peripheral circuit 304 may include various types of peripheral circuits formed using a metal oxide semiconductor (MOS) technology.

With continued reference to FIG. 14, the examples of the present disclosure further provide a memory 300, which comprises: a memory cell array 302 comprising a plurality of memory strings 310, each of which comprises a plurality of memory cells 308; and a peripheral circuit 304 which is configured to: apply a pass voltage to word lines coupled to unselected memory cells of one of the memory strings according to a program order of a selected memory cell of the memory string when performing a read operation on the selected memory cell; wherein the earlier the program order of the selected memory cell is, the greater the pass voltage applied to the word lines coupled to the unselected memory cells of the memory string during the read operation is.

Here, the peripheral circuit 304 is configured to: determine the pass voltage applied to the word lines coupled to the unselected memory cells according to the program order of the selected memory cell, i.e., according to different degrees of impact of a background pattern dependency effect experienced by the selected memory cell, such that the impact of the background pattern dependency effect can be decreased, and the read disturb is reduced.

In the examples of the present disclosure, each memory string 310 further comprises a drain selective transistor 330 and a source selective transistor 328; the peripheral circuit 304 is configured to: when performing the read operation on a selected memory cell of one of the memory strings, a pass voltage applied to word lines coupled to first unselected memory cells of the memory string is greater than a pass voltage applied to word lines coupled to second unselected memory cells of the memory string, wherein the first unselected memory cells include unselected memory cells between the selected memory cell and the source selective transistor, and the second unselected memory cells include unselected memory cells between the selected memory cell and the drain selective transistor.

In the examples of the present disclosure, the peripheral circuit 304 is further configured to: perform a program operation on the plurality of memory cells of the memory string before performing the read operation on the selected memory cell of one of the memory strings.

In the examples of the present disclosure, in the case that the program operation is a forward program operation, the peripheral circuit 304 is specifically configured to:
when performing the read operation on the selected memory cell of one of the memory strings, the smaller the number of the unselected memory cells between the selected memory cell and the source selective transistor is, the greater the pass voltage applied to the word lines coupled to the unselected memory cells of the memory string is.

In the examples of the present disclosure, in the case that program operation is a reverse program operation, the peripheral circuit 304 is specifically configured to: when performing the read operation on the selected memory cell of one of the memory strings, the smaller the number of unselected memory cells between the selected memory cell and the drain selective transistor is, the greater the pass voltage applied to the word lines coupled to the unselected memory cells of the memory string is.

In the examples of the present disclosure, the peripheral circuit 304 is further configured to: divide the plurality of memory cells of one of the memory strings into a plurality of memory groups according to the program order before performing the read operation on the selected memory cell of the memory string.

In the examples of the present disclosure, the peripheral circuit 304 is further configured to: divide the plurality of memory cells of the memory string into a first memory group, a second memory group and a third memory group according to the program order; wherein a program order of the first memory group is earlier than a program order of the second memory group, and a program order of the second memory group is earlier than a program order of the third memory group; apply a first pass voltage to the word lines coupled to the unselected memory cells of the memory string during the read operation in the case that the selected memory cell belongs to the first memory group; apply a second pass voltage to the word lines coupled to the unselected memory cells of the memory string during the read operation in the case that the selected memory cell belongs to the second memory group; and apply a third pass voltage to the word lines coupled to the unselected memory cells of the memory string during the read operation in the case that the selected memory cell belongs to the third memory group; wherein the first pass voltage is greater than the second pass voltage, and the second pass voltage is greater than the third pass voltage.

In the examples of the present disclosure, the peripheral circuit 304 is further configured to: in the case that the selected memory cell belongs to the second memory group, apply a first sub pass voltage to the word lines coupled to the unselected memory cells between the selected memory cell and the source selective transistor during the read operation and apply a second sub pass voltage to the word lines coupled to the unselected memory cells between the selected memory cell and the drain selective transistor during the read operation, wherein the first sub pass voltage is greater than the second sub pass voltage.

Figure 15:
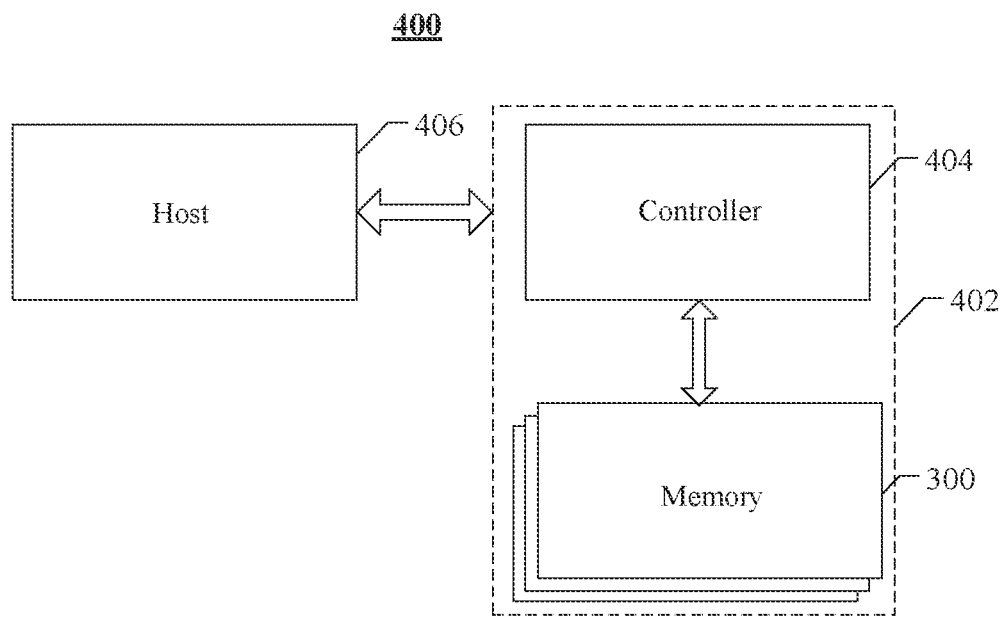
FIG. 15 is a block diagram of a system comprising memories provided by examples of the present disclosure.

Referring to FIG. 15, FIG. 15 is a block diagram of a system comprising memories provided by examples of the present disclosure. As shown in FIG. 15, the examples of the present disclosure further provide a memory system 402 which comprises: the memories 300 in the above technical solutions; and a controller 404 coupled to the memories 300 and configured to control the memories 300.

In some examples, the memories 300 can be any memory disclosed in the present disclosure. As disclosed below in detail, the memories 300, e.g., NAND flash memories (such as, three-dimensional (3D) NAND flash memories), may have a reduced leakage current from a drive transistor (e.g., a string driver) coupled to unselected word lines during erase operations, which allows for further reduction of the size of the drive transistor.

In some examples, the controller 404 may be configured to control operations of the memories 300, such as read, erase, and program operations. The controller 404 may be further configured to manage various functions with respect to data stored or to be stored in the memories 300, including, but not limited to, bad-block management, garbage collection, logical-to-physical address conversion, wear leveling, etc. In some other examples, the controller 404 is further configured to process error correction codes (ECCs) with respect to the data read from or written to the memories 300.

In some examples, any other suitable functions may be performed by the controller 404 as well, for example, formatting the memories 300. The controller 404 may communicate with an external device (e.g., a host 406) according to a particular communication protocol. For example, the controller 404 may communicate with the external device through at least one of various interface protocols, such as a Universal Serial Bus (USB) protocol, a Multi-Media Card (MMC) protocol, a Peripheral Component Interconnection (PCI) protocol, a Peripheral Component Interconnect Express (PCI-E) protocol, an Advanced Technology Attachment (ATA) protocol, a Serial-ATA protocol, a Parallel-ATA protocol, a Small Computer System Interface (SCSI) protocol, an Enhanced Small Drive Interface (ESDI) protocol, an Integrated Drive Electronics (IDE) protocol, a Firewire protocol, etc.

In some examples, the controller 404 is designed for operating in a low duty-cycle environment such as Secure Digital (SD) cards, Compact Flash (CF) cards, USB flash drives, or other media for use in electronic devices, such as personal computers, digital cameras, mobile phones, etc.

In some examples, the controller 404 is designed for operating in high duty-cycle environment Solid State Drives (SSDs) or embedded Multi-Media Cards (eMMCs) used as data stores for mobile devices, such as smartphones, tablet computers, laptop computers, etc., and enterprise storage arrays.

With continued reference to FIG. 15, the system 400 may comprise a host 406 and a memory system 402, where the memory system 402 has one or more memories 300 and a controller 404.

In some examples, the host 406 may be a processor (e.g., a Central Processing Unit (CPU)) or a System on Chip (SoC) (e.g., an Application Processor (AP)) of an electronic device. The host 406 may be configured to send or receive data to or from the memories 300. The system 400 may be a mobile phone, a desktop computer, a laptop computer, a tablet computer, a vehicle computer, a gaming console, a printer, a positioning device, a wearable electronic device, a smart sensor, a virtual reality (VR) device, an augmented reality (AR) device, or any other suitable electronic devices having memories therein.

In some examples, the controller 404 is coupled to the memories 300 and the host 406, and configured to control the memories 300. The controller 404 can manage the data stored in the memories 300 and communicate with the host 406.

The controller 404 and the one or more memories 300 can be integrated into various types of storage devices, for example, be included in the same package, such as a Universal Flash Storage (UFS) package or an eMMC package. That is, the memory system 402 can be implemented and packaged into different types of end electronic products.

Figure 16:
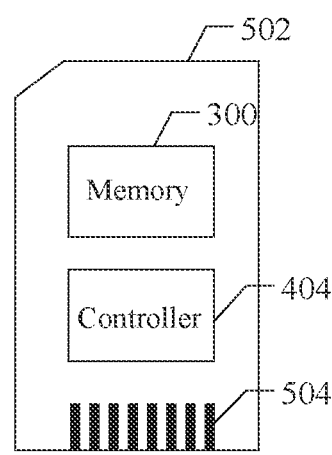
FIG. 16 is a schematic diagram of a memory card comprising a memory provided by examples of the present disclosure.

Referring to FIG. 16, FIG. 16 is a schematic diagram of a memory card comprising a memory provided by examples of the present disclosure. As shown in FIG. 16, in the examples of the present disclosure, a controller 404 and a single memory 300 may be integrated into a memory card 502. The memory card 502 may include a Personal Computer Memory Card International Association (PCMCIA) card, a CF card, a Smart Media (SM) card, a memory stick, a multi-media card (MMC, RS-MMC, MMCmicro), an SD card (SD, miniSD, microSD, SDHC), a UFS, etc. The memory card 502 may further comprise a memory card connector 504 coupling the memory card 502 to a host (e.g., the host 406 in FIG. 15).

Figure 17:
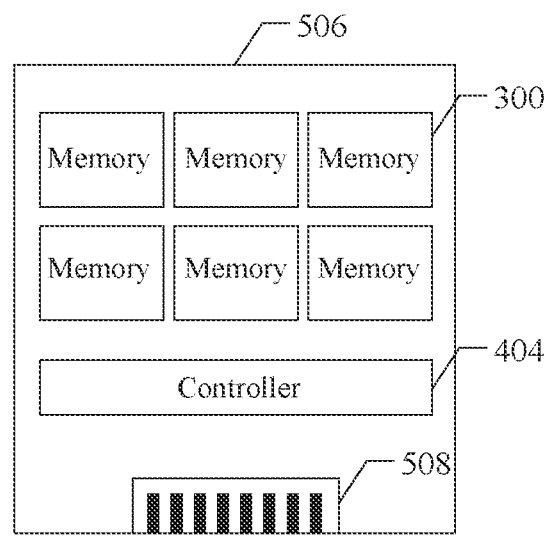
FIG. 17 is a schematic diagram of a solid-state drive comprising memories provided by examples of the present disclosure.

Referring to FIG. 17, FIG. 17 is a schematic diagram of a solid-state drive comprising memories provided by examples of the present disclosure. As shown in FIG. 17, in the examples of the present disclosure, a controller 404 and multiple memories 300 may be integrated into a solid-state drive 506. The solid-state drive 506 may further comprise a solid-state drive connector 508 coupling the solid-state drive 506 to a host (e.g., the host 406 in FIG. 15). In some examples, the storage capacity and/or the operation speed of the solid-state drive 506 are greater than the storage capacity and/or the operation speed of the memory card 502.

Figure 18:
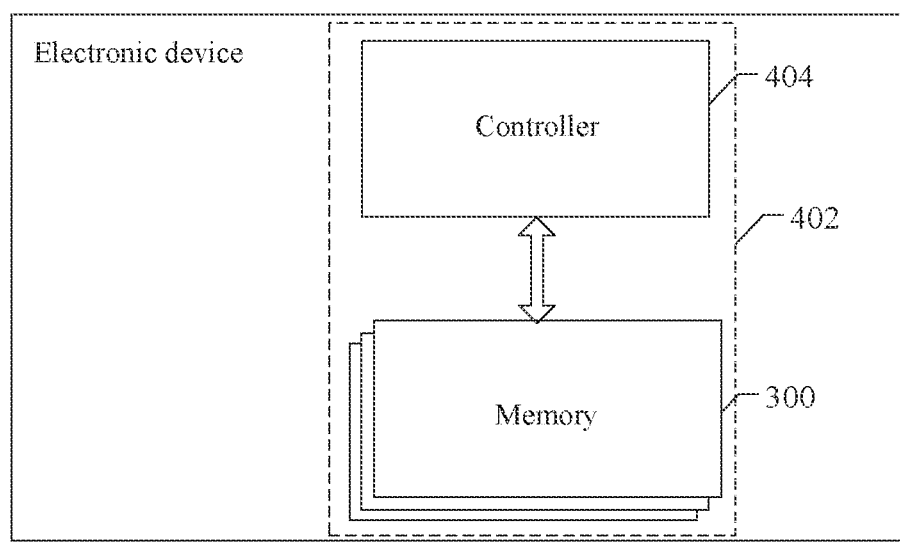
FIG. 18 is a block diagram of an electronic device comprising a memory system provided by examples of the present disclosure.

Referring to FIG. 18, FIG. 18 is a block diagram of an electronic device comprising a memory system provided by examples of the present disclosure. As shown in FIG. 18, the examples of the present disclosure further provide an electronic device 600 which comprises: the memory system 402 as described in the above technical solution. The electronic device includes a mobile phone, a desktop computer, a tablet, a notebook computer, a server, a vehicle device, a wearable device or a mobile power supply, etc.

Examples of the present disclosure further provide a computer readable storage medium on which a computer program is stored. The computer program, when being executed, can achieve the operation method in the above technical solution.

In the examples of the present disclosure, the computer readable storage medium may comprise: a Random Access Memory (RAM), a memory, a Read-Only Memory (ROM), an electrically programmable ROM, an electrically erasable programmable ROM, a register, a hard disk, a removable disk, a read only compact disc (CD-ROM), or any other forms of media of program codes well-known in the art.

The examples of the present disclosure provide a memory and an operation method thereof, a memory system and an electronic device. The operation method comprises: applying a pass voltage to word lines coupled to unselected memory cells of one of memory strings according to a program order of a selected memory cell of the memory string when performing a read operation on the selected memory cell, wherein the earlier the program order of the selected memory cell is, the greater the pass voltage applied to the word lines coupled to the unselected memory cells of the memory string during the read operation is. In the examples of the present disclosure, the pass voltage applied to the word lines coupled to the unselected memory cells is determined according to the program order of the selected memory cell, i.e., according to different degrees of impact of the background pattern dependency effect experienced by the selected memory cell, such that the impact of the background pattern dependency effect can be decreased, and the read disturb is reduced.

It is to be understood that, references to "one example" or "an example" throughout this specification mean that particular features, structures, or characteristics related to the example are included in at least one example of the present disclosure. Therefore, "in one example" or "in an example" present everywhere throughout this specification does not necessarily refer to the same example. Furthermore, these particular features, structures, or characteristics may be incorporated in one or more examples in any suitable manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are only for description, and do not represent goodness and badness of the examples.

Examples of the present disclosure provide memories and an operation methods thereof, a memory systems and an electronic devices.

In a first aspect, examples of the present disclosure provide an operation method of a memory; the memory comprises a plurality of memory strings, each of which comprises a plurality of memory cells; and the operation method comprises: applying a pass voltage to word lines coupled to unselected memory cells of one of the memory strings according to a program order of a selected memory cell of the memory string when performing a read operation on the selected memory cell; wherein the earlier the program order of the selected memory cells is, the greater the pass voltage applied to the word lines coupled to the unselected memory cells of the memory string during the read operation is.

In a second aspect, examples of the present disclosure provide a memory, which comprises: a memory cell array comprising a plurality of memory strings each comprising a plurality of memory cells; and a peripheral circuit configured to: apply a pass voltage to word lines coupled to unselected memory cells of one of the memory strings according to a program order of a selected memory cell of the memory string when performing a read operation on the selected memory cell; wherein the earlier the program order of the selected memory cells is, the greater the pass voltage applied to the word lines coupled to the unselected memory cells of the memory string during the read operation is.

In a third aspect, examples of the present disclosure provide a memory system which comprises: the memories as described in the above technical solution; and a controller coupled to the memories and configured to control the memories.

In a fourth aspect, examples of the present disclosure provide an electronic device which comprises: the memory system as described in the above technical solution.

Examples of the present disclosure provide a memory and an operation method thereof, a memory system and an electronic device. The operation method comprises: applying a pass voltage to word lines coupled to unselected memory cells of one of memory strings according to a program order of a selected memory cell of the memory string when performing a read operation on the selected memory cell, wherein the earlier the program order of the selected memory cell is, the greater the pass voltage applied to the word lines coupled to the unselected memory cells of the memory string during the read operation is. In the examples of the present disclosure, the pass voltage applied to the word lines coupled to the unselected memory cells is determined according to the program order of the selected memory cell, i.e., according to different degrees of impact of a background pattern dependency effect experienced by the selected memory cell, such that the impact of the background pattern dependency effect can be decreased, and the read disturb is reduced.

The above descriptions are merely preferred implementations of the present disclosure, and not intended to limit the patent scope of the present disclosure. Equivalent structure transformation made using the contents of the specification and the drawings of the present disclosure under the concepts of the present disclosure, or direct/indirect application to other related technical fields are both encompassed within the patent protection scope of the present disclosure.

What is claimed is:

1. A method of operating a memory, wherein the memory comprises memory strings, each of the memory strings comprises memory cells, a drain selective transistor, and a source selective transistor, the operation method comprising:

applying a pass voltage to word lines coupled to unselected memory cells of a memory string of the memory strings according to a program order of a selected memory cell of the memory string when performing a read operation on the selected memory cell of the memory string, the pass voltage comprising a first voltage and a second voltage, the first voltage applied to word lines coupled to first unselected memory cells of the memory string is greater than the second voltage applied to word lines coupled to second unselected memory cells of the memory string, wherein the first unselected memory cells include unselected memory cells between the selected memory cell and the source selective transistor, and the second unselected memory cells include unselected memory cells between the selected memory cell and the drain selective transistor; and in a program operation, programming the memory cells of the memory string, wherein the earlier the program order of the selected memory cells, the greater the pass voltage applied to the word lines coupled to the unselected memory cells of the memory string during the read operation.

2. The operation method of the memory of claim 1, wherein, in a case that the program operation is a forward program operation, applying the pass voltage to the word lines coupled to the unselected memory cells of the memory string according to the program order of the selected memory cell of the memory string when performing the read operation on the selected memory cell of the memory string, comprises, when performing the read operation on the selected memory cell of the memory string, the less of the unselected memory cells between the selected memory cell and the source selective transistor, the greater the pass voltage applied to the word lines coupled to the unselected memory cells of the memory string.

3. The operation method of the memory of claim 1, wherein, in a case that the program operation is a reverse program operation, applying the pass voltage to the word lines coupled to the unselected memory cells of the memory string according to the program order of the selected memory cell of the memory string when performing the read operation on the selected memory cell, comprises, when performing the read operation on the selected memory cell of the memory string, the less of the unselected memory cells between the selected memory cell and the drain selective transistor, the greater the pass voltage applied to the word lines coupled to the unselected memory cells of the memory string.

4. The operation method of the memory of claim 1, wherein, before performing the read operation on the selected memory cell of the memory string, the operation method further comprises classifying the memory cells of the memory string into memory groups according to the program order.

5. The operation method of the memory of claim 4, wherein, classifying the memory cells of the memory string into the memory groups according to the program order, comprises:

classifying the memory cells of the memory string into a first memory group, a second memory group, and a third memory group according to the program order, wherein a first program order of the first memory group is earlier than a second program order of the second memory group, and the second program order of the second memory group is earlier than a third program order of the third memory group;

applying a first pass voltage to the word lines coupled to the unselected memory cells of the memory string during the read operation in a case that the selected memory cell belongs to the first memory group;

applying a second pass voltage to the word lines coupled to the unselected memory cells of the memory string during the read operation in a case that the selected memory cell belongs to the second memory group; and applying a third pass voltage to the word lines coupled to the unselected memory cells of the memory string during the read operation in a case that the selected memory cell belongs to the third memory group, wherein the first pass voltage is greater than the second pass voltage, and the second pass voltage is greater than the third pass voltage.

6. The operation method of the memory of claim 5, wherein, in a case that the selected memory cell belongs to the second memory group, a first sub pass voltage is applied to the word lines coupled to the unselected memory cells between the selected memory cell and the source selective transistor during the read operation, and a second sub pass voltage is applied to the word lines coupled to the unselected memory cells between the selected memory cell and the drain selective transistor during the read operation, wherein the first sub pass voltage is greater than the second sub pass voltage.

7. A memory, comprising:

a memory cell array comprising memory strings each comprising memory cells, a drain selective transistor, and a source selective transistor; and a peripheral circuit configured to:

apply a pass voltage to word lines coupled to unselected memory cells of a memory string of the memory strings according to a program order of a selected memory cell of the memory string when performing a read operation on the selected memory cell of the memory string, the pass voltage comprising a first voltage and a second voltage, the first voltage applied to word lines coupled to first unselected memory cells of the memory string is greater than the second voltage applied to word lines coupled to second unselected memory cells of the memory string, wherein the first unselected memory cells include unselected memory cells between the selected memory cell and the source selective transistor, and the second unselected memory cells include unselected memory cells between the selected memory cell and the drain selective transistor; and in a program operation, program the memory cells of the memory strings, wherein the earlier the program order of the selected memory cells, the greater the pass voltage applied to the word lines coupled to the unselected memory cells of the memory string during the read operation.

8. The memory of claim 7, wherein, the peripheral circuit is further configured to perform the program operation on the memory cells of the memory strings before performing the read operation on the selected memory cell of the memory string.

9. The memory of claim 8, wherein, in a case that the program operation is a forward program operation, the peripheral circuit is specifically configured to, when performing the read operation on the selected memory cell of the memory string, the less of the unselected memory cells between the selected memory cell and the source selective transistor, the greater the pass voltage applied to the word lines coupled to the unselected memory cells of the memory string.

10. The memory of claim 8, wherein, in a case that the program operation is a reverse program operation, the peripheral circuit is specifically configured to, when performing the read operation on the selected memory cell of the memory string, the less of the unselected memory cells between the selected memory cell and the drain selective transistor, the greater the pass voltage applied to the word lines coupled to the unselected memory cells of the memory string.

11. The memory of claim 7, wherein, the peripheral circuit is further configured to divide the memory cells of the memory string into memory groups according to the program order before performing the read operation on the selected memory cell of the memory string.

12. The memory of claim 11, wherein, the peripheral circuit is further configured to:
divide the memory cells of the memory string into a first memory group, a second memory group, and a third memory group according to the program order, wherein a first program order of the first memory group is earlier than a second program order of the second memory group, and the second program order of the second memory group is earlier than a third program order of the third memory group;
apply a first pass voltage to the word lines coupled to the unselected memory cells of the memory string during the read operation in a case that the selected memory cell belongs to the first memory group;
apply a second pass voltage to the word lines coupled to the unselected memory cells of the memory string during the read operation in a case that the selected memory cell belongs to the second memory group; and
apply a third pass voltage to the word lines coupled to the unselected memory cells of the memory string during the read operation in a case that the selected memory cell belongs to the third memory group, wherein the first pass voltage is greater than the second pass voltage, and the second pass voltage is greater than the third pass voltage.

13. The memory of claim 12, wherein, the peripheral circuit is further configured to, in a case that the selected memory cell belongs to the second memory group, apply a first sub pass voltage to the word lines coupled to the unselected memory cells between the selected memory cell and the source selective transistor during the read operation and apply a second sub pass voltage to the word lines coupled to the unselected memory cells between the selected memory cell and the drain selective transistor during the read operation, wherein the first sub pass voltage is greater than the second sub pass voltage.

14. A memory system, characterized in that, the memory system comprises:
a memory cell array comprising memory strings each comprising memory cells, a drain selective transistor, and a source selective transistor; and
a peripheral circuit configured to:
apply a pass voltage to word lines coupled to unselected memory cells of a memory string of the memory strings according to a program order of a selected memory cell of the memory string when performing a read operation on the selected memory cell of the memory string, the pass voltage comprises a first voltage and a second voltage, the first voltage applied to word lines coupled to first unselected memory cells of the memory string is greater than the second voltage applied to word lines coupled to second unselected memory cells of the memory string, wherein the first unselected memory cells include unselected memory cells between the selected memory cell and the source selective transistor, and the second unselected memory cells include unselected memory cells between the selected memory cell and the drain selective transistor; and
in a program operation, program the memory cells of the memory strings, wherein the earlier the program order of the selected memory cells, the greater the pass voltage applied to the word lines coupled to the unselected memory cells of the memory string during the read operation; and
a controller coupled to the memory and configured to control the memory system.

15. The memory system of claim 14, wherein, the peripheral circuit is further configured to perform the program operation on the memory cells of the memory string before performing the read operation on the selected memory cell of the memory string.

16. The memory system of claim 15, wherein, in a case that the program operation is a forward program operation, the peripheral circuit is specifically configured to, when performing the read operation on the selected memory cell of the memory string, the less of the unselected memory cells between the selected memory cell and the source selective transistor, the greater the pass voltage applied to the word lines coupled to the unselected memory cells of the memory string.

17. The memory system of claim 14, wherein, in a case that the program operation is a reverse program operation, the peripheral circuit is specifically configured to, when performing the read operation on the selected memory cell of the memory string, the less of the unselected memory cells between the selected memory cell and the drain selective transistor, the greater the pass voltage applied to the word lines coupled to the unselected memory cells of the memory string.

* * * * *